(12) United States Patent
Suman et al.

(10) Patent No.: US 9,137,537 B2
(45) Date of Patent: Sep. 15, 2015

(54) DYNAMIC REFERENCE FRAME DECISION METHOD AND SYSTEM

(75) Inventors: Kopparapu Suman, Bangalore (IN); Pallapothu Shyam Sundera Bala Koteswara Gupta, Bangalore (IN); Ramkishor Korada, Bangalore (IN); Raghu Tippuru SrikanthaRao, Bangalore (IN)

(73) Assignee: Flextronics AP, LLC, San Jose, CA (US)

(*) Notice: Subject to any disclaimer, the term of this patent is extended or adjusted under 35 U.S.C. 154(b) by 2203 days.

(21) Appl. No.: 11/346,619

(22) Filed: Feb. 1, 2006

(65) Prior Publication Data
US 2007/0177666 A1     Aug. 2, 2007

(51) Int. Cl.
| | |
|---|---|
| H04N 7/12 | (2006.01) |
| H04N 11/02 | (2006.01) |
| H04N 11/04 | (2006.01) |
| H04N 19/139 | (2014.01) |
| H04N 19/176 | (2014.01) |
| H04N 19/70 | (2014.01) |
| H04N 19/172 | (2014.01) |
| H04N 19/46 | (2014.01) |
| H04N 19/557 | (2014.01) |
| H04N 19/58 | (2014.01) |

(52) U.S. Cl.
CPC ........... *H04N 19/139* (2014.11); *H04N 19/172* (2014.11); *H04N 19/176* (2014.11); *H04N 19/46* (2014.11); *H04N 19/557* (2014.11); *H04N 19/58* (2014.11); *H04N 19/70* (2014.11)

(58) Field of Classification Search
CPC . H04N 19/139; H04N 19/172; H04N 19/176; H04N 19/46

USPC .............. 375/240.16, 240.12–240.15, 240.23
See application file for complete search history.

(56) References Cited

U.S. PATENT DOCUMENTS

| | | | | |
|---|---|---|---|---|
| 5,661,524 | A * | 8/1997 | Murdock et al. | 375/240.15 |
| 6,052,417 | A * | 4/2000 | Fujiwara et al. | 375/240.12 |
| 6,782,052 | B2 | 8/2004 | Sun et al. | |
| 7,242,716 | B2 * | 7/2007 | Koto et al. | 375/240.16 |
| 2002/0172284 | A1 * | 11/2002 | Peng et al. | 375/240.15 |
| 2004/0218676 | A1 * | 11/2004 | Ha et al. | 375/240.16 |
| 2005/0135481 | A1 * | 6/2005 | Sung | 375/240.16 |
| 2005/0152452 | A1 * | 7/2005 | Suzuki | 375/240.16 |

(Continued)

OTHER PUBLICATIONS

Chang, Andy, A Novel Approach to Fast Multi-Frame Selection for H.264 Video Coding, 2003, IEEE, pp. II-704-II-707.

(Continued)

*Primary Examiner* — Nhon Diep
(74) *Attorney, Agent, or Firm* — Sheridan Ross P.C.

(57) ABSTRACT

A system and method for determining the efficient number of reference frames which are to be evaluated for an image using frame level adaptation techniques. The system and method determines and updates the number of reference frames which are to be searched based on the reference frame selection statistics of the previously coded frame. Preferably, the invention increases the number of reference frames to be referred when a first desired ratio of blocks refer to the furthest reference frame. The invention decreases the number of reference frames if a second desired ratio of blocks refer to the furthest reference frame. The motion value is considered in increasing the number of reference frames. The invention evaluates whether portions of the image frames are static, thereby terminating motion vector searches on that portion.

25 Claims, 9 Drawing Sheets

(56) References Cited

U.S. PATENT DOCUMENTS

2005/0175092 A1    8/2005   Puri et al.
2005/0175105 A1*   8/2005   Gu et al. .................. 375/240.24
2005/0276323 A1   12/2005   Martemyanov

OTHER PUBLICATIONS

Khang, Xi Min, Adaptive Field/Frame Selection for High Compression Coding, 2003, MERL 10 pages.

Office Action in Taiwan Patent Application No. 096103752, issued Sep. 2, 2011.

International Search Report and Written Opinion for International (PCT) Application No. PCT/US07/02809 mailed Dec. 7, 2007, 8 pages.

International Preliminary Report on Patentability for International (PCT) Application No. PCT/US07/02809 mailed Aug. 5, 2008, 5 pages.

English Translation of Official Action for Taiwan Patent Application No. 096103752 dated Feb. 18, 2013, 2 pages.

Zhang, Xi Min, Adaptive Field/Frame Selection for High Compression Coding, 2003, MERL 10 pages.

Notice of Allowance (with English translation) for Taiwan Patent Application No. 096103752 dated Jun. 21, 2013, 4 pages.

\* cited by examiner

DYNAMIC REFERENCE FRAME DECISION METHOD AND SYSTEM

FIELD OF THE INVENTION

The invention relates to video compression methods, in general, and in particular, an efficient dynamic reference frame decision method and system.

BACKGROUND OF THE INVENTION

Video compression is used in applications which require transmission and/or storage of video information. Video information is organized in layers having groups of frames. Each group of frames include a series of single frames, whereby each single frame has a still image. When processed, the single frames are processed to run together and form a continuous motion of images, thereby simulating a motion frame in digital format. Each image frame in the series of frames is broken up into several macroblocks, whereby each macroblock includes several blocks. Each block within a macroblock includes several pixels, whereby the number of pixels in each block depends on the type of video compression format as well as the resolution being used.

H.264 is the state-of-the-art video compression format that is rapidly gaining acceptance in various multimedia markets. H.264 is similar to the MPEG (Moving Frames Experts Group) standard, except H.264 is made of a 4×4 pixel coding unit.

The H.264 format is believed to have a much higher compression performance than its predecessors as well as the codec of choice in terms of flexibility. However, the exceptional compression performance attributed to the H.264 comes at the cost of increased computational complexity, especially at the encoder module in a video compression system. The flexibility provided by H.264, in terms of the number of reference frames that can be used, makes the search for best motion vector methods very complex. For instance, the JM reference code versions perform an exhaustive search for different reference frames in the H.264 format. This search involves very high computational complexity which can make the H.264 standard difficult to utilize in real-time applications. To reduce this complexity, a variety of fast algorithms have been proposed for a more efficient motion vector search.

These proposed algorithms reduce the complexity of choosing between different reference frames by using block level decision-making process. For instance, the reference frames for each block are predicted by analyzing the reference frames of the neighboring blocks or the "sub-pixel locations" of the collocated blocks in all the reference frames.

One known method of choosing the best reference frame for each block reduces the number of reference frames that are evaluated during the compression. The number of reference frames which are to be evaluated is determined based on the farthest reference frame that is chosen by looking at the neighboring blocks along with a pre-chosen addition factor. This method is subject to the condition that it does not exceed the maximum number of reference frames specified in the parameter sets.

Another known method involves selecting the reference frame for each block. For every block, a "sub-pixel location" is determined based on the sub-pixel location of the reference block in the immediate reference frame and the sub-pixel motion vector with respect to the said immediate reference frame. Early termination checks can be applied to motion estimation process. For instance, if a Sum of Absolute Differences (SAD) calculation between the block and the immediate reference frame meets a desired value or if the region is "flat", no further search is performed with respect to the other reference frames. If these early exit conditions are not satisfied, motion estimation is performed on all of the other reference frames. The method analyzes the sub-pixel locations of the blocks collocated to the current block in different reference frames, whereby only those reference frames in which these sub-pixel locations are distinct are chosen for motion vector search. If the collocated blocks in two reference frames have the same sub-pixel location, the one closer to the current frame is chosen. This reduces the number of reference frames that are considered in the search.

Though the prior art methods achieve reduction in computational complexity, they do leave a lot of scope for further reduction. For example, in the method where the number of reference frames for the current block is determined based on the best reference frames chosen for the neighboring blocks and a pre-chosen addition factor, the addition factor should at least be a value of 1 for the mechanism to adapt well. This would mean that even for frames which do not require more than one reference frame, at least one additional frame would be used. Similarly, within a frame, some blocks might require only one reference picture to be considered, while the others may need more. In that case, the minimum number of reference pictures is bounded by the pre-chosen addition factor that is used which leads to sub-optimality in complexity reduction.

The method that employs the sub-pixel positions for reducing the complexity, depends heavily on the motion vector search mechanism. The performance of the method when the motion vector search itself has sub-optimalities as in the case of real-time applications can reduce drastically. The method also requires considerable additional storage for storing the sub-pixel locations of all the pixels.

What is needed is a system and method which dynamically and efficiently determines the number of reference frames needed to efficiently encode the image frame.

BRIEF DESCRIPTION OF THE INVENTION

A system and method for efficiently determining the number of reference frames which are to be evaluated for an image using frame level adaptation techniques. The system and method determines and updates the number of reference frames which are to be searched based on the reference frame selection statistics of the previously coded frame. Preferably, the invention increases the number of reference frames to be referred when greater than a first desired ratio of blocks refer to the furthest reference frame. The invention decreases the number of reference frames if less than a second desired ratio of blocks refer to the furthest reference frame. The motion value is considered in increasing the number of reference frames. The invention evaluates whether portions of the image frames are static, thereby terminating motion vector searches on that portion.

BRIEF DESCRIPTION OF THE DRAWINGS

The accompanying drawings, which are incorporated into and constitute a part of this specification, illustrate one or more embodiments of the invention and, together with the detailed description, serve to explain the principles and implementations of the invention.

In the drawings.

DETAILED DESCRIPTION

Figure 1:
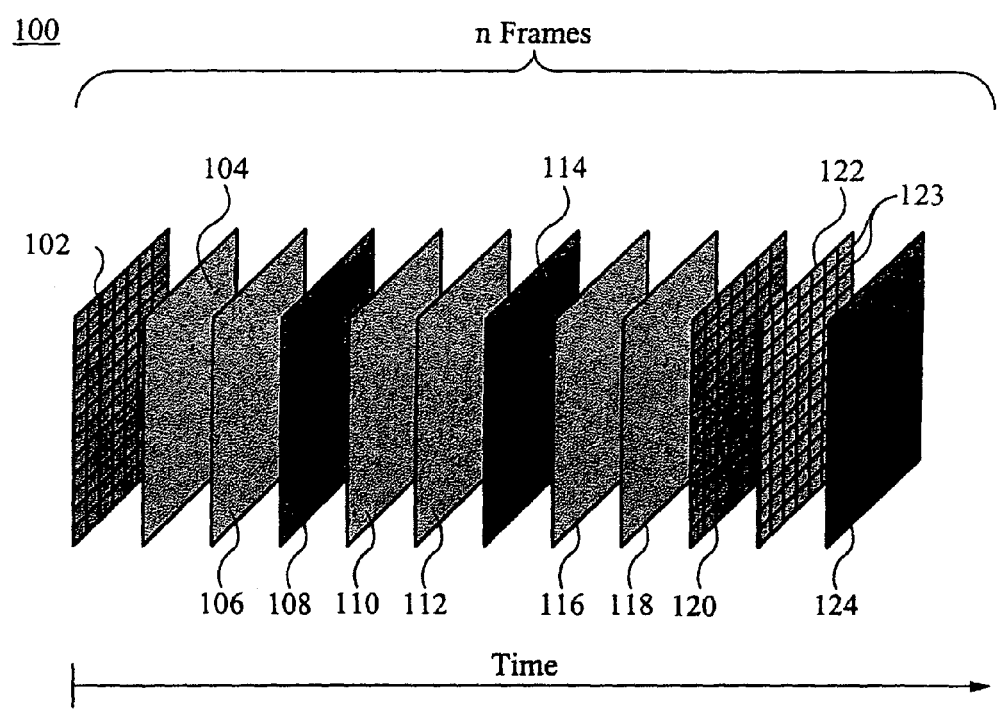
FIG. 1 illustrates a schematic of a group of image frames in accordance with one embodiment of the invention.

Embodiments of the invention are described herein in the context of a video compression system including an encoder. Those of ordinary skill in the art will realize that the following detailed description of the invention is illustrative only and is not intended to be in any way limiting. Other embodiments of the invention will readily suggest themselves to such skilled persons having the benefit of this disclosure. Reference will now be made in detail to implementations of the invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and bandwidth-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In general, the invention is directed to a system and method for dynamically determining the maximum number of reference frames which are to be evaluated for all the macroblocks of an image preferably using a frame level decision technique and a macroblock/block level decision technique. For brevity, the macroblock/block level decision technique is referred to hereinafter as block level decision technique although either block or macroblocks are evaluated using the block level decision technique. The system and method determines and accordingly updates the number of reference frames which are to be searched based on the reference frame selection statistics of the previously coded frame as well as the number of reference frames to be used on each block/macroblock. The system and method considers that the content as well as the motion of each block does not substantially change between frames. Thus, the statistics of the blocks in the previous image frames can be assumed to be the same for the blocks in the current image frame in many instances. It is preferred that the system and method of the invention is applied to the H.264 standard, although the system and method of the invention may be used with other standards.

FIG. 1 illustrates an example schematic of a group of image frames of a video sequence used during a video motion search in accordance with an embodiment of the invention. As shown in the example in FIG. 1, the video sequence 100 has n number of frames arranged horizontally along the flow of time. In the example, the image frame 122 is designated as the frame currently being evaluated, whereby frames 118, 116, 114, etc., precede current frame 122 in time and frame 124 is subsequent to the current frame 122 in time.

The current frame 122, as shown in FIG. 1, includes several blocks 123, whereby each block contains a matrix of pixels. The blocks can be grouped into sets of one or more macroblocks. For instance, the frame may include one or more 16×16 macroblocks whereby the macroblock can be further partitioned into block sizes of 16×8, 8×16, 8×8, 8×4, 4×8 or 4×4 base on the type of video coding standard being used.

The system and method uses a two level approach in reducing the number of reference frames to be evaluated during motion estimation. The system and method preferably utilizes a frame level, also referred to herein as frame level decision technique or adaptation to determine the maximum number of reference frames to be referred to for all blocks in the current frame. The system also performs a block level decision making technique to independently determine the number of reference frames to be evaluated for each block in the current frame.

The frame level decision approach provides an advantage in the case of frames where the optimal number of reference frames to be evaluated for all blocks of the frame may be 1. Accordingly, no bits are spent on encoding the reference frame index at the block level, because the frame level decisions will indicate that all the blocks in the current frame will use one (the nearest) reference frame. For instance, when the number of reference images to be evaluated for the current image is determined to be 1, the 'num_ref_idx_10_active_minus1' syntax element in the slice header, which is the maximum number of reference frames allowed, can be set to be 0. As will be discussed, frame level decisions made on the frames also have the advantage of decreasing the number of reference frames toward a value of 1 if the motion of the sequence is too fast or too slow.

Figure 2:
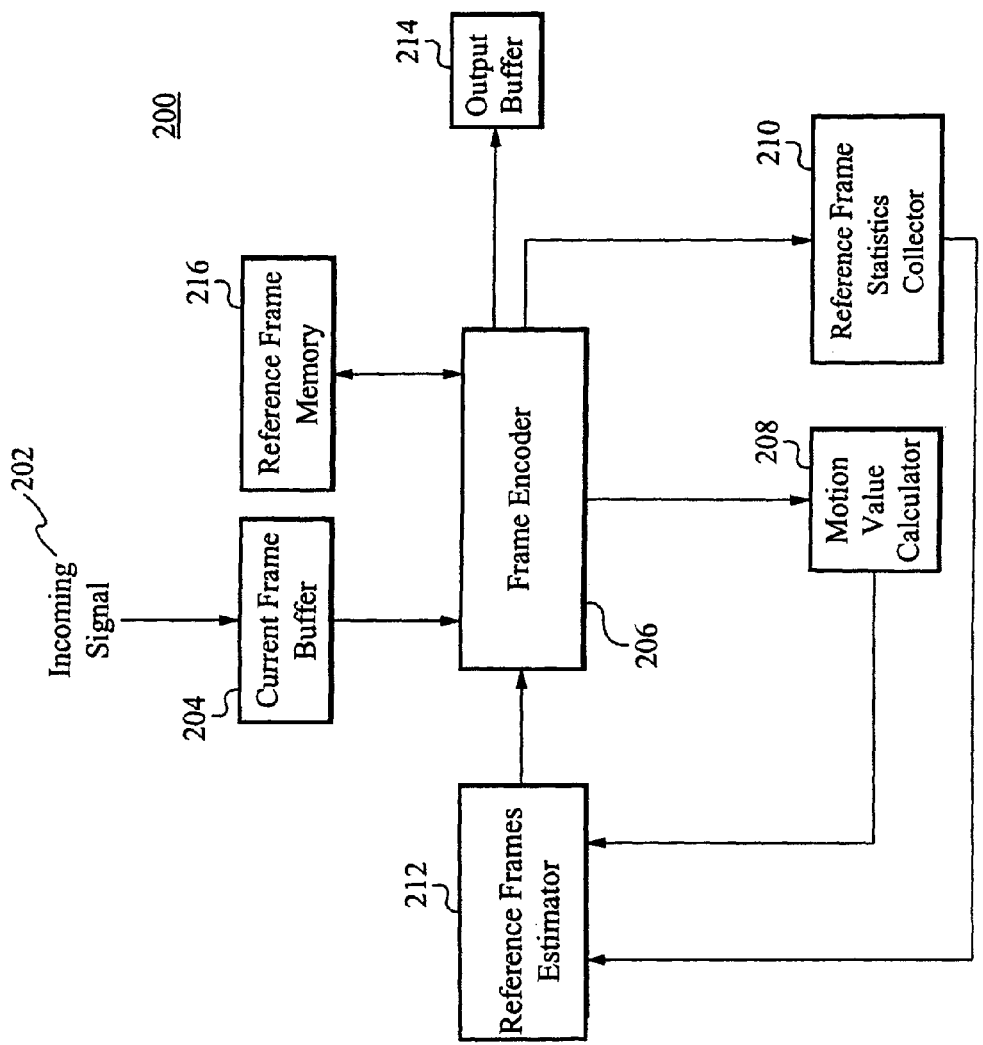
FIG. 2 illustrates a block diagram of a video compression encoder of the system in accordance with one embodiment.

FIG. 2 illustrates a schematic of an encoder of the system in accordance with an embodiment of the invention. It should be noted that the encoder 200 in FIG. 2 is a simplified diagram and does not illustrate every component of the encoder 200. As shown in FIG. 2, the encoder 200 receives an input signal 202 representing a sequence of image frames like the example shown in FIG. 1, whereby the received image frames are preferably sent to the current frame buffer module 204 one after the other where they are stored. Each image frame is preferably sent from the frame buffer module 204 to the frame encoder module 206, whereby the current frame is encoded.

The frame encoder module 206 encodes the current frame to produce the bitstream. It also performs decoding operation similar to that of a decoder to reconstruct the frame so that the frames to be coded in future can use the frame as a reference frame. This reconstruction loop is carried out for frames that the encoder wishes to use as reference in future. It is assumed that all the frames are marked as reference frame. Once the frame is coded and reconstructed, the bit stream is sent to the output buffer 214 and the reconstructed frame is stored in the reference frame memory 216. The statistics of how many times any particular reference picture is used are collected in the reference frame statistics collector 210. The motion vector statistics are calculated in motion value calculator 208. When the next picture arrives, the frame level decision for the maximum number of reference frames (NumRefs) to be used is taken in reference frames estimator 212 using the data stored/obtained from reference frames statistics collector 210 and motion value calculator 208.

The output buffer 214 outputs the compressed signal over one or more wired and/or wireless mediums to a decoding module (not shown). The decoding module (not shown) receives and reconstructs the compressed frames and sends the reconstructed frames to a television, PDA, cell phone, videophone, computer, handheld computer, server and/or monitor.

FIG. 2 is a functional block diagram, whereby the blocks in FIG. 2 are separated based on their functionality. The blocks physically (in terms of implementation) may not be separated in the same manner.

As previously stated, the system and method also preferably performs a block level decision technique on the current frame 122 itself during motion estimation of the frame 122. The frame encoder 206 preferably utilizes the motion estimator/compensator module (not shown) to perform this method. As will be discussed in more detail below, the frame encoder 206 may further reduce the NumRefs value (see below) to a smaller value to increase efficiency of the system. It should be noted that the frame encoder 206 includes additional components which are known in the art and are not discussed in detail herein.

Figure 3A:
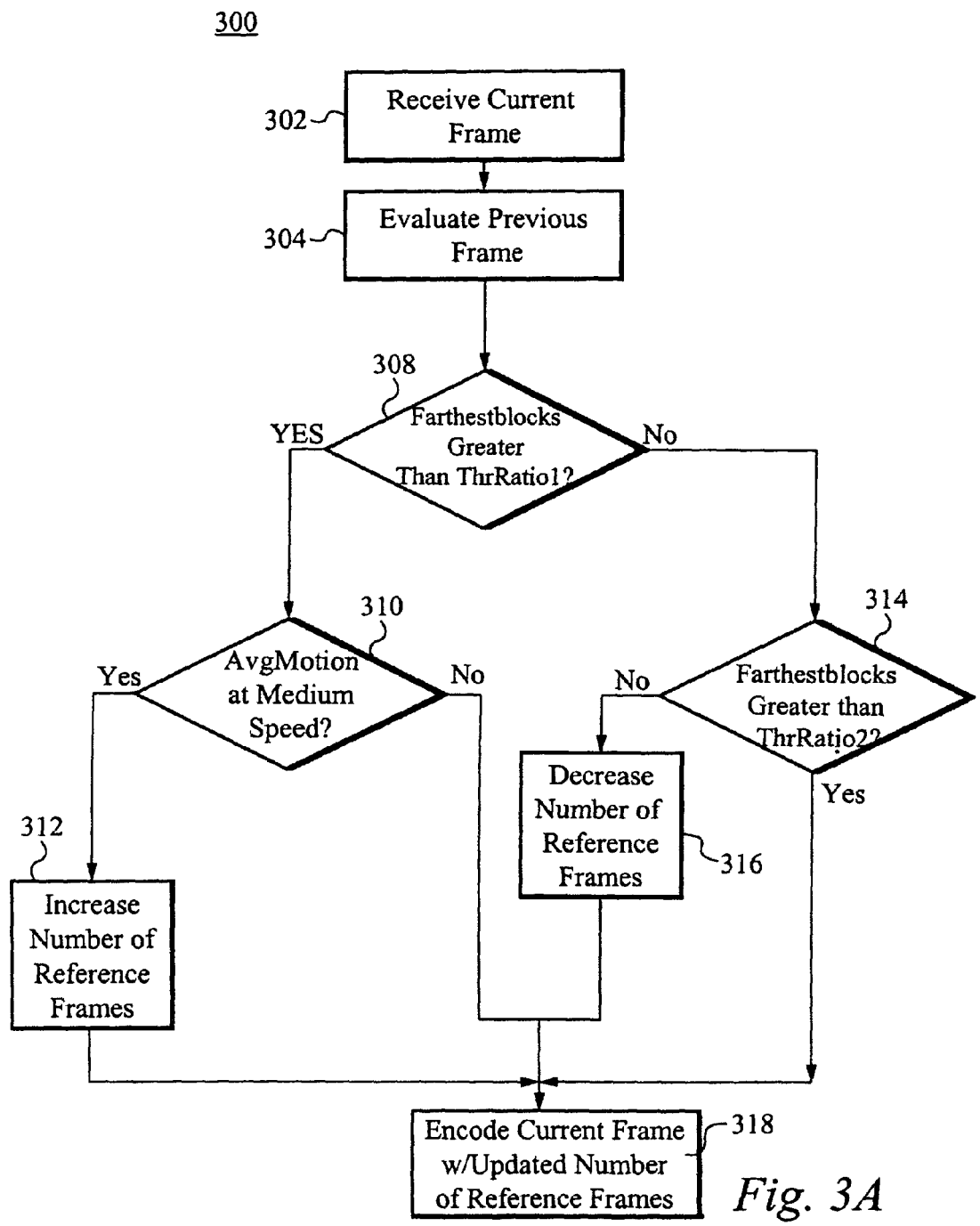
FIG. 3A illustrates a flow chart diagram of the frame level technique of the encoding method in accordance with an embodiment of the invention.

FIG. 3A illustrates a flow diagram of a method to dynamically determine an efficient number of reference frames for the current image in accordance with one embodiment of the invention. In step 302, the current frame 122 is received. If the current frame is an intra-coded frame, then by definition, the number of reference frames is 0. So the process in FIG. 3A is not invoked. It is to be noted that the first frame of the sequence is always an intra-coded frame.

In an embodiment, as shown in step 304, the system and method evaluates the reference frame statistics of the frame previous to the current frame using the frame level decision technique. If the previous frame 120 is an intra-coded frame, there are no reference frame statistics available since intra coded frames use no reference frames. So the number of reference frames for the current frame is set to 1 directly and the process in FIG. 3A is not invoked. Otherwise, the frame level decision for deciding the number of reference frames for the current frame 122 is preferably based on the statistics of the frame previous (frame 120 in FIG. 1) to the current frame 122. Alternatively or additionally the frame level decision is based on the statistics of frame 124 subsequent to the current frame 122. The statistics which are used in performing the frame level decision technique are the number of blocks in the previous frame that refer to the farthest reference frame (of all the reference frames referred to by the previous frame). For example, the reference frame farthest from the previous frame 120, as shown in FIG. 1, can be frame 102, although not necessarily. The number of blocks that refer to this farthest reference frame is termed the Farthestblocks value in the present method. The frame level decision also makes use of the total number of blocks in the previous frame (hereinafter termed Totalblocks)

In another embodiment of the invention, Farthestblocks can be computed as the average number of blocks in the previous frame that refer to one or more farthest reference frames.

In yet another embodiment of the invention, Farthestblocks can be obtained by averaging the number of blocks in one or more previous frames that refer to one or more farthest reference frames of those said previously coded frames.

It should be noted that in the preferred embodiment, the previous frame means the temporally previous frame (in the display order). However, other embodiments of the invention can use any previously coded frame (temporally previous or temporally future) for calculating the Farthestblocks value.

In terms of determining the Farthestblocks and Totalblocks values based on macroblocks, a 16×16 macroblock would be designated as 1 unit; a 16×8 or 8×16 block would be designated as 0.5 units; a 8×8 block would be designated as 0.25 units, etc. The frame level decision technique of the invention also utilizes the number of reference frames which are referred to by the previous frame, NumRefs. In addition, the frame level technique also utilizes the average motion of the previous frame AvgMotion. The Totalblocks value is preferably the difference between the total number of macroblocks in the frame and the number of macroblocks which are coded as intra-frame macroblocks.

As stated above, although the reference frames are preferably previous in time to the current frame, reference frames can be forward in time to the current frame 122. Thus, the NumRefs and the Farthestblocks values are direction sensitive and should indicate the number of forward reference frames and/or blocks used in the previous frame.

In evaluating the current frame in Step 304, a ratio of the Totalblocks/Numrefs is determined (hereinafter RATIO). The RATIO value is the number of blocks in the previous frame which should have referred to the farthest reference frame had all the reference frames been equally referred to.

The system and method of the invention weighs the RATIO value to provide the upper and lower threshold limits to be applied on the Farthestblocks value. These weighted values are designated herein as ThrRatio1 and ThrRatio2 and are used to determine the effective number of reference frames to use for the current frame. It is apparent that other appropriate measures can be used to determine the effective number of reference frames to use for the image frame without departing from the spirit and scope of the invention.

As shown in Step 308, the system and method determines whether too many or two few blocks in the previous frame refer to the farthest reference frame. In particular, the Farthestblocks value is compared to threshold ratios ThrRatio1 and ThrRatio2 obtained from the Totalblocks and Numrefs values of the previous frame. The ThrRatio1 and ThrRatio2 values are obtained by weighting RATIO with an experimental factor. In an embodiment, the ThrRatio1 value is obtained by multiplying RATIO by a factor of 0.5 and the ThrRatio2 value is obtained by multiplying RATIO by a factor of 0.15. It is contemplated that the ThrRatio1 and ThrRatio2 values can be weighted with other values.

As shown in FIG. 3A, the system and method compares the Farthestblocks value with the ThrRatio1 value in Step 308. In particular, if the Farthestblocks value is found to be less than the ThrRatio1 value, then the system will then compare the Farthestblocks value with the ThrRatio2 (Step 314). The ThrRatio2 value serves as an upper parameter limit at which the decision is made as to whether the number of reference frames should be decreased in encoding the current frame 122. The ThrRatio2 value is determined experimentally and is dependent on the application in which the system and method is used.

If it is determined in Step 314 that the Farthestblocks value is not greater than the ThrRatio2 value, then it the system will conclude that too few blocks out of the total number of blocks in the previous frame 120 refer to the farthest reference frame. In such a case, the system and method preferably reduces the number of reference frames by a value of 1 (Step 316), whereby the updated number reference frames (NewNumRefs) is the maximum number of reference frames that any block of the current frame 122 can use. Reducing the maximum number of reference frames for the current frame 122 will not affect its prediction efficiency, because the majority of blocks in the current frame refer to a closer reference frame. Although the number of reference frames is decreased by a value of 1, it should be noted that the number of references can be alternatively decreased by more or less than a value of 1.

However, as shown in Step 314 in FIG. 3A, if it is determined that the FarthestBlocks value is greater than the ThrRatio2 value and less than the ThrRatio1 value, then the previous frame is being encoded at the optimum value of maximum reference frames. Therefore, the system and method will update the NewNumRefs value to not increase or decrease, and the maximum number of reference frames to be used on any block in the current frame 122 will be the same as the value used for the previous frame 120.

Referring back to Step 308, if it is determined that the Farthestblock value is greater than ThrRatio1, the system and method will determine that a significant number of blocks in the previous frame refer to the farthest reference frame and the number of reference frame may be increased. However, the system and method also preferably determines whether the average motion of the previous frame is within a desired range such that the motion of the frame is not too fast or slow.

In an embodiment, as shown in FIG. 3A, the system and method preferably determines in Step 310 whether the values of the motion vectors of the macroblocks in the previous frame is greater or less than a motion value criteria. It should be noted that Step 310 can be performed within Step 304 in one embodiment when the macroblock is evaluated for motion vector prediction. It is contemplated that Step 310 can alternatively occur at a different step without departing from the spirit and scope of the invention.

The system and method determines whether the motion vectors are within the predetermined motion value criteria, because increasing the number of reference frames would not produce any gain in efficiency when the motion of the blocks is too fast or too slow. Nonetheless, the system and method will increase the number of reference frames if it is determined that the motion value of the blocks in the image are within the predetermined motion value criteria (Step 310). Therefore, the system and method monitors motion of the image blocks to prevent extraneous computation while keeping the quality loss low.

In an embodiment, all motion vectors of all macroblocks with respect to the closest reference frame are preferably calculated and averaged over the whole frame to compute the value of average motion in the frame. The average motion value is referred to herein as AvgMotion; In one embodiment, 16×16 macroblock motion vectors of the previous image 120 are averaged to obtain the average motion value for the current frame 122. In an embodiment, the system utilizes the motion vectors of the macroblocks partitions as well as the sub-partitions to calculate the average motion value. It should be noted that the system and method can use any other appropriate method to calculate the average motion value and is not limited to the particular calculation method disclosed herein. For example, motion vectors of one or more previously coded frames with respect to one or more of their reference frames may be used to compute the average motion value. Also motion vectors of the current frame with respect to one or more of its reference frames may also be used wherever possible.

In an embodiment, the system and method forms a ratio of the AvgMotion value over the sum of the width and height of the frame. This ratio value is referred to herein as MotionRatio. The system and method in Step 310 compares MotionRatio with upper and lower threshold values ThrMotion1 and ThrMotion2, respectively, to determine whether the motion is too high or too low. The ThrMotion1 and ThrMotion2 values are based on the size of the image as well as the types of formats (e.g. CIF, QCIF, etc.) Thus, the system and method can be applied for frames of any size and formats. The ThrMotion1 and ThrMotion2 values are also dependent on the pixel resolution of the frames.

As mentioned, the AvgMotion value is based on motion of the vectors with respect to the closest reference frame. In a case where the closest reference frame is not the immediately preceding frame to the current frame, the average motion is normalized using the temporal distance between the two frames in one embodiment. One method of normalizing the average motion is to divide the average motion value by the temporal distance between two consecutive image frames. It should be noted, however, that any other known methods of computing the average motion are contemplated within the invention. For example, sub-macroblock/sub-block partition motion vectors can be used. Alternatively, motion vectors with respect to any of the reference frames can be used, whereby the motion vectors can be appropriately scaled to compute the average motion.

In an embodiment, if the AvgMotion value is greater than ThrMotion1, the system and method determines that the motion of the frame is too high. In an embodiment, if the AvgMotion is less than ThrMotion2, the system and method determines that the motion of the frame is too low. In either case, the Numrefs value is unchanged and the process goes to Step 318.

However, if the system and method determines that the AvgMotion value is less than ThrMotion1 and greater than ThrMotion2, then the Numrefs value is preferably increased by a value of 1 (Step 312). It should be noted that although the number of reference frames is preferably increased by 1, the number of reference frames can be increased by more or less than a value of 1.

Once the NumRefs value is updated, the system and method begins motion estimation on the current frame. This can be done using block or macroblock level decision making. While processing each block or macroblock, the number of reference frames to be evaluated for that block or macroblock can be reduced to a smaller value.

Figure 3B:
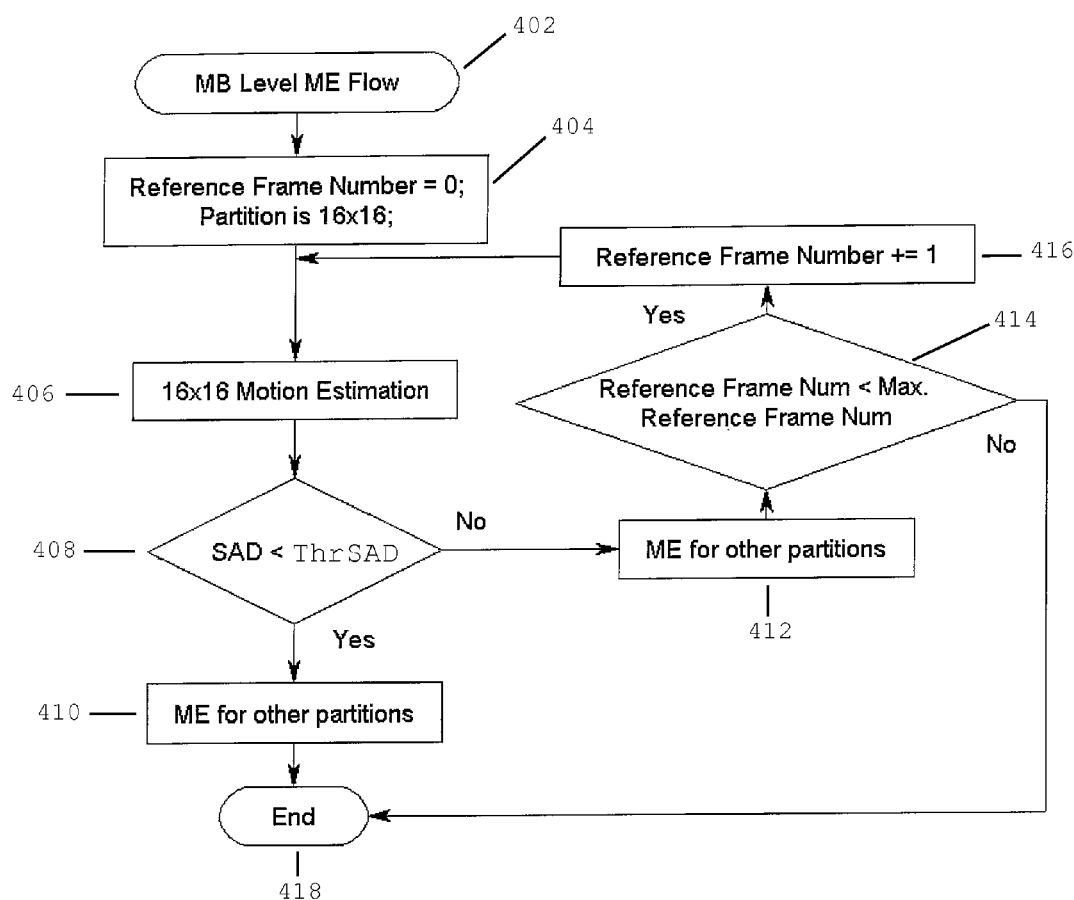
FIG. 3B illustrates a flow chart diagram of the macroblock/block level technique of the encoding method in accordance with an embodiment of the invention.
Figure 4:
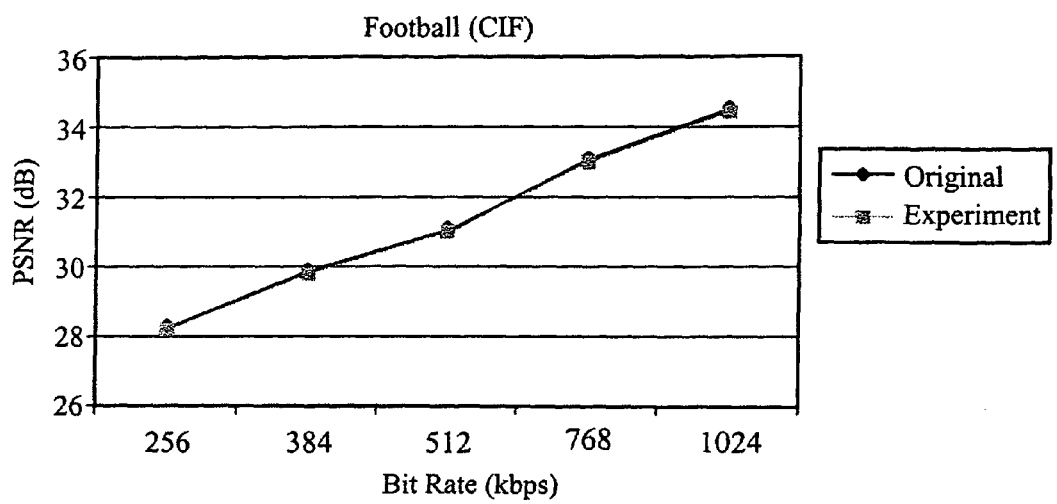
FIGS. 4-8 illustrate graphs of the rate distortion performance of the coding invention for different CIF sequences.
Figure 5:
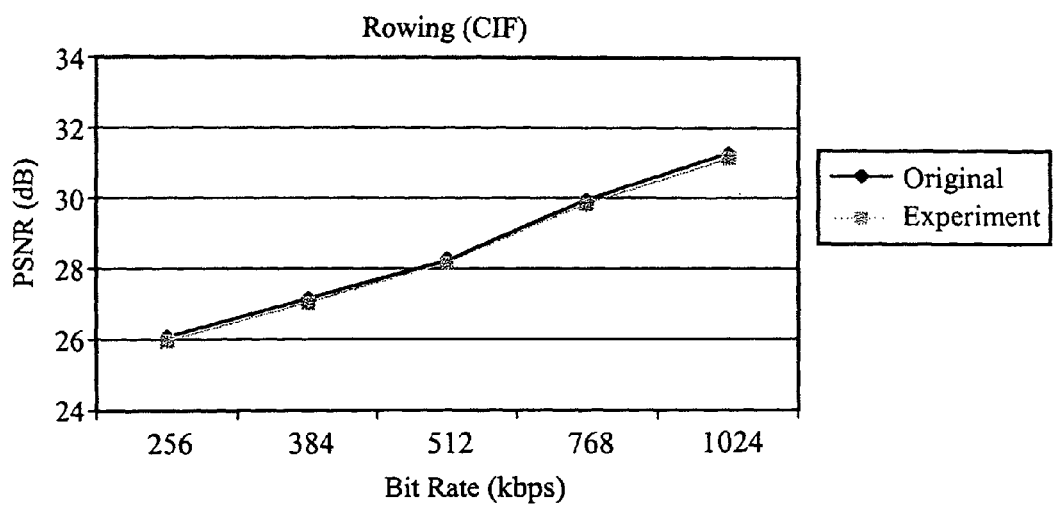
Figure 6:
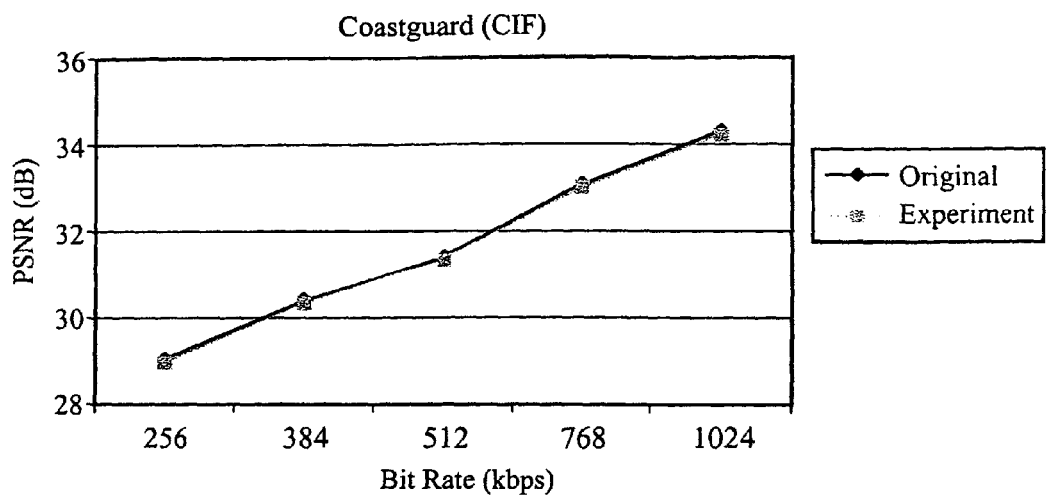
Figure 7:
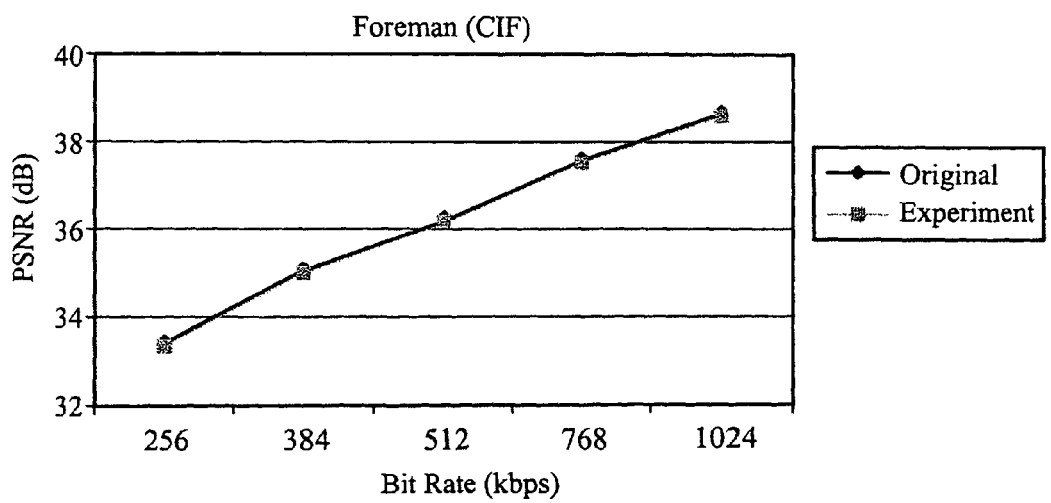
Figure 8:
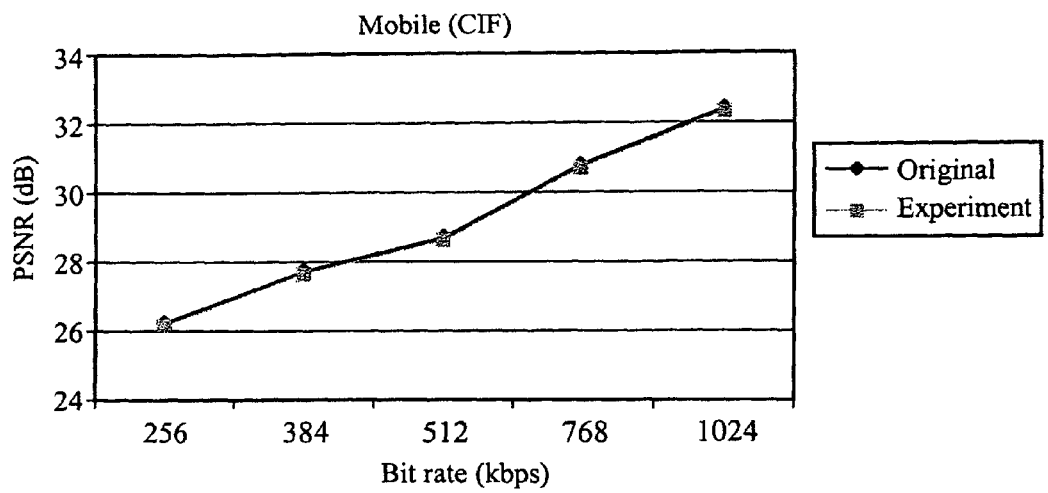
Figure 9:
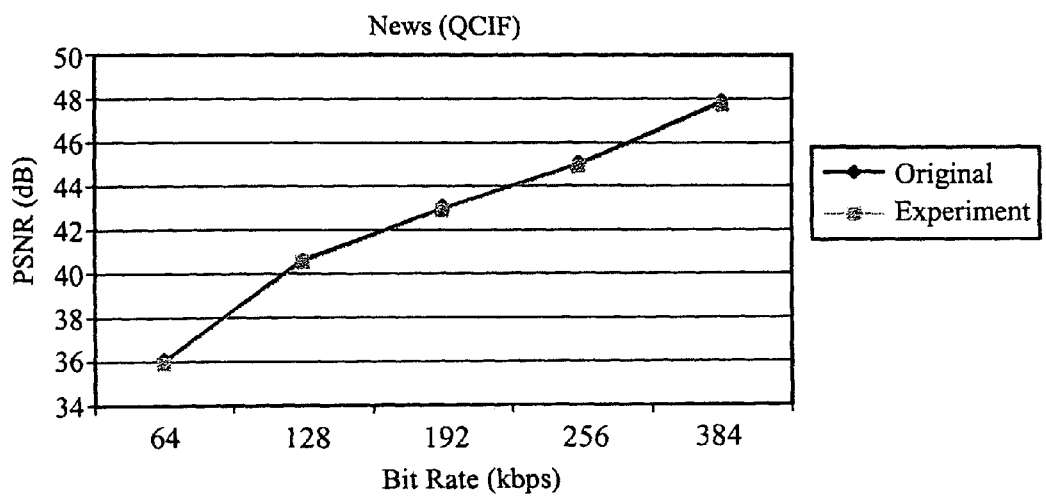
FIGS. 9-13 illustrate graphs of the rate distortion performance of the coding invention for different QCIF sequences.
Figure 10:
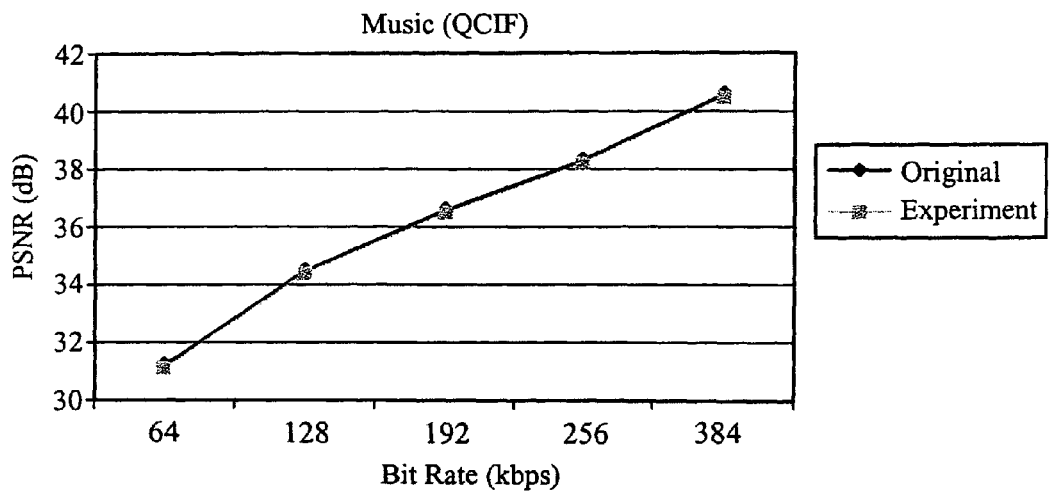
Figure 11:
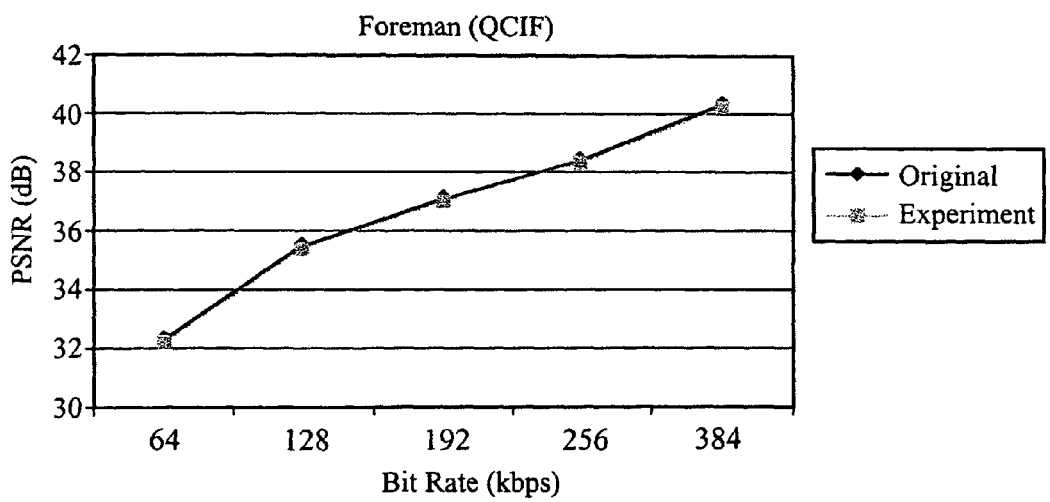
Figure 12:
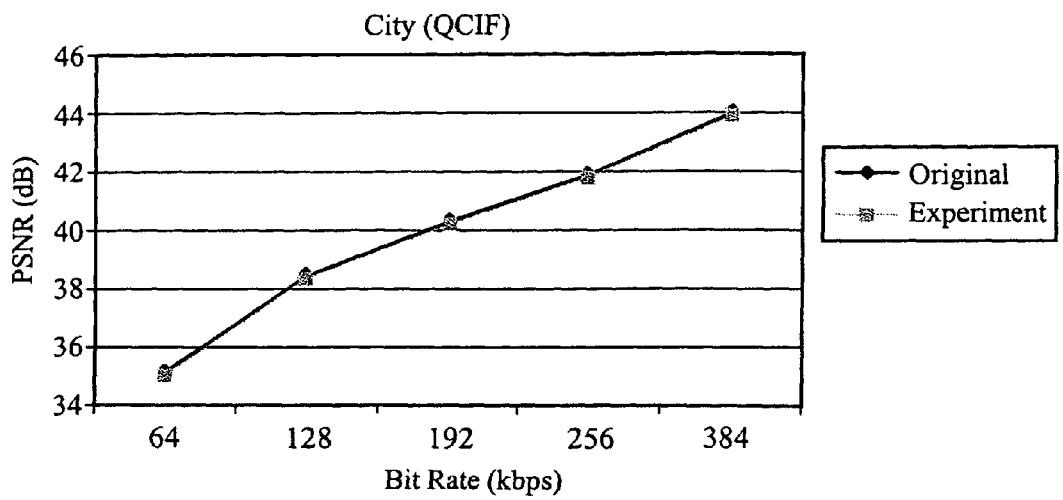
Figure 13:
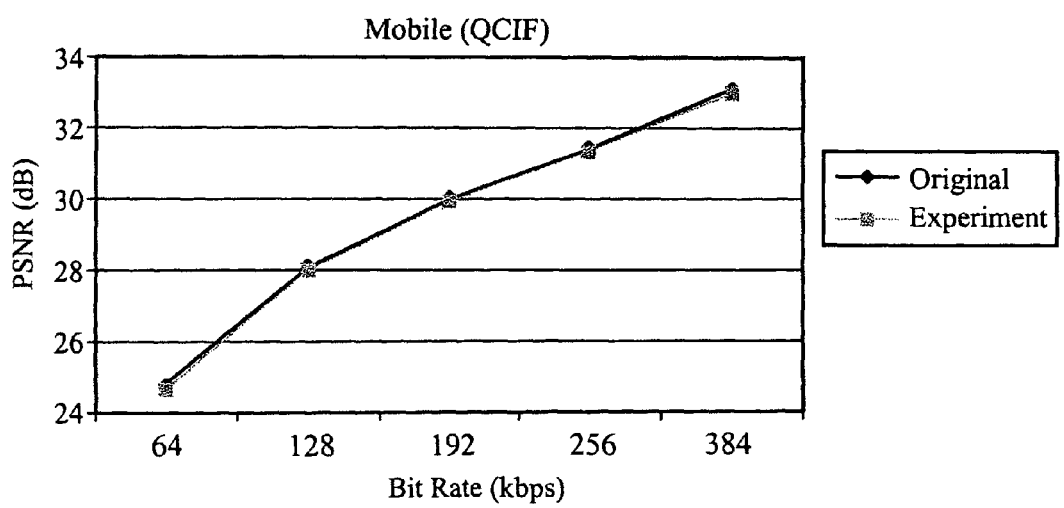

FIG. 3B illustrates one method of performing the block level decision technique in accordance with the invention to determine whether an early termination decision can be made. As shown in FIG. 3B, motion estimation is performed on the current frame preferably on a macroblock level (Step 402). As shown in Step 404, the motion estimation starts with reference frame 0, which is the closest reference frame. Also, for the sake of illustration, a hierarchical search mechanism is used where 16×16 partition motion search is done first followed by sub-block motion vector search. However one can use the same method for any other search mechanism. As shown in Step 406, the motion estimation is performed on the 16×16 macroblock matrix using any appropriate technique.

As shown in Step 408, the system and method utilizes appropriate Sum of Absolute Difference (SAD) calculations in determining whether the early termination condition applies to the particular macroblock or block. For each macroblock, the system will determine if the SAD value obtained for the macroblock is less than a threshold SAD value, hereinafter designated as ThrSAD. Although the encoder 200 uses the 16×16 (macroblock) SAD value (before performing sub-partitions motion estimation), it can alternatively use the sum of the sub-partition SADs of that macroblock (after performing the sub-partitions motion estimation) to take the macroblock level decision. It should also be note that although the encoder 200 utilizes SAD measurements in one embodiment, the encoder can alternatively perform the macroblock level decision based on the rate-distortion cost or other appropriate measure instead of SAD calculations without departing from the spirit and scope of the invention.

The ThrSAD value is preferably determined based on the image quality of the frames as well as the desired performance of the encoder 200. A relatively small ThrSAD value may not significantly improve the computational performance of the coding system nor reduce the image quality of the frame. In contrast, a relatively large ThrSAD value may significantly improve the computational performance of the coding system, but will also reduce the image quality of the frames. The ThrSAD value can range between 384 and 512, however other values can be used depending on the application in which the encoder 200 is used.

If the system and method determines that the SAD value is less than the ThrSAD value in step 306, then no further reference frames are considered for that macroblock. Motion estimation for all the partitions (16×8, 8×16, 8×8 etc.) is carried out with respect to the given reference frame (Step 410). The motion estimation of the current macroblock ends (Step 418) and the motion estimation for the next macroblock is initiated (Step 402). However, if the SAD value is greater than the ThrSAD value, the partition motion search is completed for that macroblock with respect to the given reference frame and motion estimation with respect to the next reference frame, subject to a maximum of NumRefs, is carried out for the same macroblock (Step 406).

As shown in FIG. 3B, the system and method compares (Step 414) the reference frame number to the maximum reference frame number to be used for the current frame 122 determined using the frame-level mechanism, and if reference frame number evaluated is less than the maximum reference frame number, the reference frame number is incremented (Step 416) and motion estimation is done with respect to the next reference frame (Step 406). Otherwise, the motion estimation of the current macroblock ends (Step 418) and the motion estimation for the next macroblock is initiated (Step 402).

It should be noted that the block level technique disclosed in FIG. 3B serves only as an example of one type of block level process. The system and method of the invention is thus not limited to the process shown in FIG. 3B, and any other block level technique may be used without departing from the spirit and scope of the invention.

The evaluation termination condition avoids searching any additional reference image frames for a particular macroblock in the current frame 122. Such a condition may be appropriate in the case in which the macroblock does not change or move (e.g. is a static region such as background of the image). The early termination condition may also save computational resources in the case that some portions of the current frame are moving and need a larger number of reference frames whereas some portions are static and require a small number of reference frames. In the case that an early termination condition exists, the system will terminate evaluation of that macroblock and evaluate the next macroblock.

Tables 1 and 2 shown below illustrate the results of experiments carried out using JM7.4 reference software for common intermediate format (CIF) and quarter common intermediate format (QCIF) sequences, respectfully. The PSNR values were computed by enabling all the tools to achieve the best quality in the reference software. The experiment was carried out in the H.264 baseline profile. However it is contemplated that the scheme can be used for other profiles as well. The bit rate was 512 kbps for the CIF sequences and 128 kbps for the QCIF sequences at a frame rate of 30 frames per second sequences in each sequence. The maximum number of reference frames is set to 5 in the example below.

TABLE 1

CIF Sequence Results

| Sequence (CIF) | Existing Algorithm 5 reference frames PSNR | Proposed Algorithm (With maximum reference frames set to 5) | |
| --- | --- | --- | --- |
| | | PSNR | Average Number of Reference Frames Used |
| Football | 31.03 | 31.01 | 1.35 |
| Rowing | 28.30 | 28.22 | 1.32 |
| Coastguard | 31.39 | 31.32 | 2.10 |
| Foreman | 36.20 | 36.12 | 3.21 |
| Mobile | 28.93 | 28.86 | 4.02 |

TABLE 2

QCIF Sequence Results

| Sequence (QCIF) | Existing Algorithm 5 reference frames PSNR | Proposed Algorithm (With maximum reference frames set to 5) | |
| --- | --- | --- | --- |
| | | PSNR | Average Number of Reference Frames Used |
| News | 40.58 | 40.50 | 1.37 |
| Music | 34.72 | 34.64 | 2.57 |
| Foreman | 35.39 | 35.30 | 3.14 |
| City | 38.47 | 38.37 | 3.22 |
| Mobile | 28.10 | 28.00 | 3.90 |

As can be seen in Tables 1 and 2, the system and method uses more reference frames for the sequences where use of multiple reference frames yields substantial gains. For fast motion and slow motion sequences, the invention dynamically updates the number of reference frames used which thereby results in a significant reduction in computational complexity. The system and method achieves a reduction in computational complexity of up to 75% of that without using the algorithm, whereby the amount of loss in quality using the method is significantly small in comparison (around 0.1 dB).

FIGS. 4-8 illustrate graphs of the rate distortion performance of the coding system for the CIF sequence in Table 1. FIGS. 9-13 illustrate graphs of the rate distortion performance of the coding system for the QCIF sequence in Table 2. The horizontal axis represents the bit rate whereas the vertical axis represents the peak signal to noise ratio PSNR (i.e. distortion). In FIGS. 4-8, the bit rates considered were 256 kbps, 384 kbps, 512 kbps, 768 kbps and 1024 kbps. In FIGS. 9-13, the bit rates evaluated were 64 kbps, 128 kbps, 192 kbps, 256 kbps and 384 kbps. A frame rate of 30 frames per second was used in all of the sequences. As shown in FIGS. 4-13, the graphs indicate that the PSNR loss due to the invention is quite small over a wide range of bit rates in comparison to the existing compression algorithm.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for evaluating a current frame for motion estimation implemented on a video compression system including an encoder, the method comprising:
   determining a number of reference frames referred to by a previously coded frame;
   determining a number of blocks of the previously coded frame which refers to a farthest reference frame;
   comparing the number of blocks of the previously coded frame which refers to the farthest reference frame with a desired threshold range; and
   updating the number of reference frames to be used with the current frame when the number of blocks is within the desired threshold range.

2. The method of claim 1, wherein updating further comprises increasing the number of reference frames when the number of blocks is greater than an upper threshold value.

3. The method of claim 1, wherein updating further comprises decreasing the number of reference frames when the number of blocks is less than a lower threshold value.

4. The method of claim 2, wherein the upper threshold value further comprises a ratio of a total number of blocks of the previously coded frame by a total number of reference frames used in the previously coded frame, wherein the ratio is multiplied with a first weighted value.

5. The method of claim 3, wherein the number of reference frames does not change for the current frame when the number of blocks is greater than the lower threshold value and less than the upper threshold value.

6. The method of claim 3, wherein the lower threshold value further comprises a ratio of a total number of blocks of the previous frame by a total number of reference frames used in the previously coded frame, wherein the ratio is multiplied with a second weighted value.

7. The method of claim 1, wherein updating further comprises not changing the number of reference frames to be used with the current frame.

8. The method of claim 1, further comprising determining whether an early termination condition is satisfied.

9. The method of claim 2, further comprising calculating an average motion of the previously coded frame, wherein the number of reference frames is increased when the number of blocks of the previously coded frame is greater than the upper threshold limit and the average motion is within a motion threshold range.

10. The method of claim 9, wherein the average motion is calculated using motion vectors of the previously coded frame.

11. The method of claim 9, wherein the average motion is calculated using motion vectors of one or more previously coded frames with respect to one or more reference frames.

12. The method of claim 9, wherein the average motion is calculated using motion vectors of the current frame.

13. The method of claim 1, wherein the number of blocks compared with the desired threshold range are an average number of blocks.

14. The method of claim 1, wherein the previously coded frames are prior to the current frame in a display order.

15. The method of claim 1, wherein the previously coded frames are subsequent to the current frame in a display order.

16. The method of claim 1, further comprising performing a block level decision technique on the current frame after updating the number of reference frames.

17. A digital video compression system adapted to receive a digitized video signal comprising:
   a first module to determine a number of reference frames referred to by a frame previous to a current frame;
   a second module to determine a number of blocks of the previous frame which refers to a farthest reference frame; and
   a third module to update the number of reference frames to be used with the current frame when the number of blocks which refers to the farthest reference frame is within a desired threshold range.

18. The system of claim 17, wherein the current frame is encoded utilizing the updated number of reference frames.

19. The system of claim 17, wherein the number of references frames is increased when an average motion of the current frame is within a desired motion value range.

20. The system of claim 17, wherein the number of reference frames is decreased when the number of blocks is less than a lower threshold ratio.

21. The system of claim 17, wherein the encoder evaluates the current frame using a frame level approach.

22. An encoder adapted for use in a digital video compression system, the encoder adapted to receive a video signal having a sequence of frames, the encoder comprising:
   means for determining a number of reference frames referred to by a previously coded frame;
   means for determining a number of blocks of the previously coded frame which refers to a farthest reference frame; and
   means for updating the number of reference frames to be used for a current frame when the number of blocks is within a desired threshold range.

23. A non-transitory computer-readable storage medium having stored thereon instructions that, when executed, cause one or more processors to:
   determine a number of reference frames referred to by a previously coded frame;
   determine a number of blocks of the previously coded frame which refers to a farthest reference frame;
   compare the number of blocks of the previously coded frame which refers to the farthest reference frame within a desired threshold range; and
   update the number of reference frames to be used with the current frame when the number of blocks is within the desired threshold range.

24. The non-transitory computer-readable storage medium of claim 23, wherein the instructions, when executed, cause one or more processors to increase the number of reference frames when the number of blocks is greater than an upper threshold value.

25. The non-transitory computer-readable storage medium of claim 23, wherein the instructions, when executed, cause one or more processors to decrease the number of reference frames when the number of blocks is less than a lower threshold value.

* * * * *